United States Patent
Lubin et al.

(10) Patent No.: US 10,949,692 B2
(45) Date of Patent: Mar. 16, 2021

(54) 3D DYNAMIC STRUCTURE ESTIMATION USING SYNCHRONIZED IMAGES

(71) Applicant: SRI International, Menlo Park, CA (US)

(72) Inventors: Jeffrey Lubin, Princeton, NJ (US); James R. Bergen, Pennington, NJ (US)

(73) Assignee: SRI International, Menlo Park, CA (US)

( * ) Notice: Subject to any disclaimer, the term of this patent is extended or adjusted under 35 U.S.C. 154(b) by 88 days.

(21) Appl. No.: 16/297,262

(22) Filed: Mar. 8, 2019

(65) Prior Publication Data
US 2019/0278974 A1    Sep. 12, 2019

Related U.S. Application Data

(60) Provisional application No. 62/640,277, filed on Mar. 8, 2018.

(51) Int. Cl.
G06K 9/00 (2006.01)
G06T 7/73 (2017.01)
G06T 7/80 (2017.01)

(52) U.S. Cl.
CPC ..... *G06K 9/00899* (2013.01); *G06K 9/00201* (2013.01); *G06K 9/00261* (2013.01);
(Continued)

(58) Field of Classification Search
CPC ........... G06K 9/00483; G06K 9/00201; G06K 9/00261; G06K 9/00899; G06K 9/00362;
(Continued)

(56) References Cited

U.S. PATENT DOCUMENTS

| 6,826,292 B1 | 11/2004 | Tao et al. |
| 8,345,988 B2 | 1/2013 | Shan et al. |

(Continued)

FOREIGN PATENT DOCUMENTS

| WO | 2016/182607 A1 | 11/2016 |
| WO | 2018/175603 A1 | 9/2018 |

OTHER PUBLICATIONS

"Lecture 6—Features and Image Matching" accessed from https://courses.cs.washington.edu/courses/cse455/09wi/Lects/lect6.pdf, 61 pp.

(Continued)

*Primary Examiner* — Casey L Kretzer
(74) *Attorney, Agent, or Firm* — Shumaker & Sieffert P.A.

(57) ABSTRACT

Techniques for verifying identity of a human subject to an identification document are described. In some examples, a computing device may be connected to least two cameras oriented such that a first field of view is a substantially opposite direction from a second field of view. The device may receive images from the first camera that include a human subject. Second images from the second camera may include images of an ID document with a photograph of the human subject. The device may process the first images along with the respective, corresponding second images to determine respective 3D locations for at least one of cameras at the respective times the images were captured. Based on the sequence of 3D locations, along with the first images and the second images, the device may determine whether the human subject is a valid human subject.

13 Claims, 5 Drawing Sheets

(52) U.S. Cl.
 CPC ..... *G06K 9/00362* (2013.01); *G06K 9/00483*
 (2013.01); *G06T 7/73* (2017.01); *G06T 7/80*
 (2017.01); *G06T 2207/30201* (2013.01); *G06T*
 *2207/30244* (2013.01)

(58) Field of Classification Search
 CPC ... G06T 7/73; G06T 7/80; G06T 2207/30201;
 G06T 2207/30244
 See application file for complete search history.

(56) References Cited

U.S. PATENT DOCUMENTS

| | | | |
|---|---|---|---|
| 9,268,994 B2 | 2/2016 | Chakraborty et al. | |
| 9,740,963 B2 | 8/2017 | Sawhney et al. | |
| 2014/0270482 A1 | 9/2014 | Chakraborty et al. | |
| 2014/0347475 A1 | 11/2014 | Divakaran et al. | |
| 2015/0138314 A1* | 5/2015 | Vincent | H04N 5/23238 348/38 |
| 2015/0264567 A1* | 9/2015 | Sensharma | G06K 9/22 455/411 |
| 2016/0042252 A1 | 2/2016 | Sawhney et al. | |
| 2017/0357878 A1 | 12/2017 | Sawhney et al. | |
| 2018/0139377 A1 | 5/2018 | Zhang et al. | |
| 2019/0278977 A1* | 9/2019 | Zheng | G06K 9/00664 |

OTHER PUBLICATIONS

"Oct. 2013 Embedded Vision Summit East Presentations," accessed from https://www.embedded-vision.com/summit/oct2013/presentations#Eledath, Oct. 2013, 12 pp.

"The Oct. 2013 Embedded Vision Summit East," accessed from https://www.embedded-vision.com/summit/oct2013/overview, Oct. 2013, 8 pp.

Bergen et al., "Computing Two Motions from Three Frames," Proceedings Third International Conference on Computer Vision, Dec. 1990, 6 pp.

Kurugollu et al., "Image Segmentation Based on Multi-scan Constraint Satisfaction Neural Network," Pattern Recognition Letters, vol. 20, No. 14, Dec. 1999, 7 pp.

Mitchell et al., "Expanding Application of the Wiggers Diagram to Teach Cardiovascular Physiology," Advances in Physiology Education, vol. 38, No. 2, Jun. 2014, 6 pp.

ODNI News Release No. 22-17 entitled "IARPA Launches "Odin" Program to Harden Biometric Technology Against Attack," Oct. 2017, 6 pp.

Yoshida, "What? DARPA Does Open-Source?" EE Times, Sep. 24, 2013, 2 pp.

* cited by examiner

3D DYNAMIC STRUCTURE ESTIMATION USING SYNCHRONIZED IMAGES

This application claims the benefit of U.S. Provisional Application No. 62/640,277, entitled "PHYSICAL SECURITY FOR SMARTPHONE-BASED ID VERIFICATION," and filed on Mar. 8, 2018, which is incorporated herein by reference in its entirety.

TECHNICAL FIELD

The disclosure relates to estimating the three-dimensional (3D) structure of objects based on visual images of the objects and the object's environment.

BACKGROUND

The 3D structure of objects may be estimated based on a plurality of images of the object. Some examples may include stereoscopic images of an object from two or more cameras or from the same camera placed in two or more locations. Other examples may include estimating the 3D structure of a tooth for making a crown using multiple images from a camera and developing 3D models for 3D printers or computer numeric control (CNC) tools. 3D structure may apply to identity verification. Verification of identity by a human may involve verifying that a human subject matches an identification (ID) document. The human verifier may consult the ID document for information about the human subject, such as physical height and weight, hair and eye color, and match a photograph on the ID document to the human subject. ID verification by automated means, such as using a camera, may be spoofed, for example, by holding up a photograph, wearing a mask or holding up a mannequin head that matches the ID document photo. Also, ID documents may be fraudulent.

SUMMARY

In general, the disclosure is directed to techniques for estimating the 3D structure of objects by analyzing images captured, substantially synchronously, from multiple fields of view of separate cameras. For example, a computing device may be connected to least two cameras oriented such that a field of view of a first camera is in substantially an opposite direction from the field of view of a second camera. The computing device may, for instance, be a smartphone having dual cameras located on opposite sides. The computing device may receive first images from the first camera, the first images including images of a human subject or other objects, along with background features in the field of view that includes the objects. The computing device may also receive second images from the second camera that include images of the environment in which the object is located.

The computing device may process the first images and the second images to determine respective three-dimensional (3D) locations for at least one of cameras at the respective times the first images and the second images were captured. Based on the sequences of 3D locations, the first images, and the second images, the computing device may determine an accurate location of the first and second cameras. The computing device may use the location of the cameras to add constraints to improve the estimates of the 3D structure of one or more objects.

By analyzing separate sequences of images with substantially opposite fields of view, the techniques may provide technical improvements having one or more practical applications. In some examples, the techniques may base, at least in part, identify verification on structure from motion for 3D structure and behavior of a human subject over time. In some examples, moreover, the techniques may incorporate reflections of the human subject within the second images taken from a reflective surface in the same environment as the human subject, such as an ID document. The computing device may verify that the interaction of specular reflections with surface features matches the expected physical optics given the first and second camera locations. As a result, the techniques may improve the 3D structure estimation, include a volume estimation. One example application of the 3D structure may include a more robust spoof detection of ID documents and/or of facial features of the human subject.

A method for identity verification, the method comprising: receiving, by a computing device, first images from a first camera with a first field of view, wherein the first images comprise a human subject and are within the first field of view; receiving, by the computing device, second images from a second camera with a second field of view, wherein the second images comprise images of an identification (ID) document, wherein the ID document comprises a photograph of the human subject, wherein the second field of view is in substantially an opposite direction from the first field of view, and wherein each image of the first images has a corresponding one of the second images captured substantially synchronously with the image; processing, by the computing device, the first images with the respective, corresponding second images to determine a sequence of respective three-dimensional (3D) locations, for at least one of the first camera and the second camera, at the respective times the first images and the corresponding second were substantially synchronously captured; determining, by the computing device based on the sequence of 3D locations, the first images, and the second images, that the human subject is a valid human subject; in response to determining that the human subject is a valid human subject and that the ID document describes the valid human subject, performing an action.

A method of computing a three-dimensional (3D) structure of an object, the method comprising: receiving, by a computing device, first images from a first camera with a first field of view, wherein the first images comprise the object and are within the first field of view; receiving, by the computing device, second images from a second camera with a second field of view, wherein the first camera and the second camera move in 3D space relative to the object; wherein the second field of view is in substantially an opposite direction from the first field of view, and wherein each image of the first images has a corresponding one of the second images captured substantially synchronously with the image; processing, by the computing device, the first images with the respective, corresponding second images to determine a sequence of respective three-dimensional (3D) locations, for at least one of the first camera and the second camera, at the respective times the first images and the corresponding second were substantially synchronously captured; computing, by the computing device based on the sequence of 3D locations, the first images, and the second images, the 3D structure of the object.

A computing device comprising: a memory; and one or more processors coupled to the memory, wherein the one or more processors are configured to: receive first images from a first camera with a first field of view, wherein the first images comprise a human subject and are within the first field of view; receive second images from a second camera with a second field of view, wherein the second images comprise images of an identification (ID) document, wherein the ID document comprises a photograph of the human subject, wherein the second field of view is in substantially an opposite direction from the first field of view, and wherein each image of the first images has a corresponding one of the second images captured substantially synchronously with the image; process the first images with the respective, corresponding second images to determine a sequence of respective three-dimensional (3D) locations, for at least one of the first camera and the second camera, at the respective times the first images and the corresponding second were substantially synchronously captured; determine, based on the sequence of 3D locations, the first images, and the second images, that the human subject is a valid human subject; in response to determining that the human subject is a valid human subject and that the ID document describes the valid human subject, performing an action.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
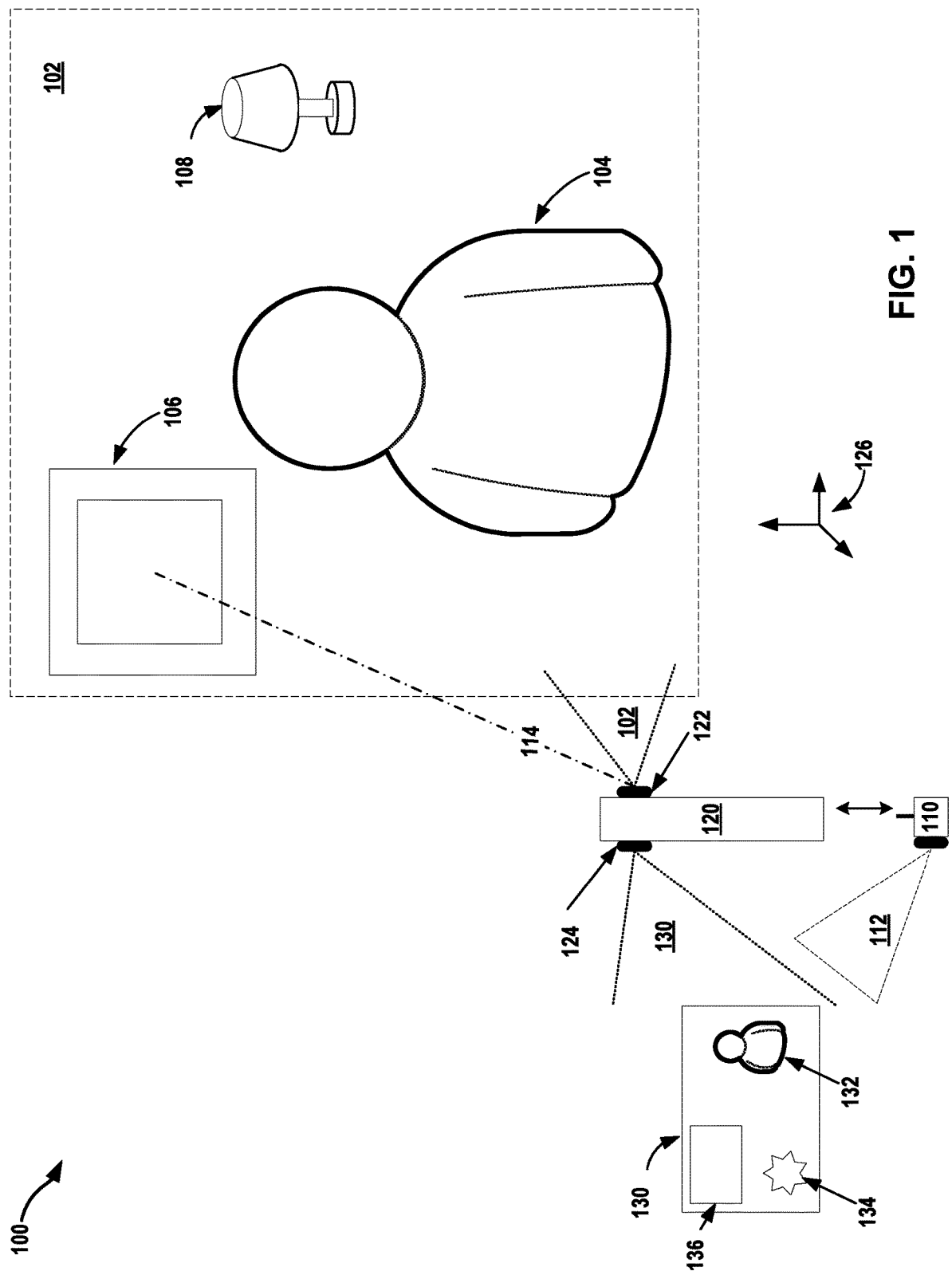
FIG. 1 is a conceptual diagram illustrating techniques for determining the 3D structure of one or more objects according to one or more techniques of this disclosure.

FIG. 1 is a conceptual diagram illustrating techniques for determining the 3D structure of one or more objects according to one or more techniques of this disclosure. The example of FIG. 1 focuses on example techniques for determining whether an ID document identifies a valid human subject. However, this is only one example application of 3D structure estimation.

In the example of FIG. 1, system 100 may determine whether the ID document is valid, whether the human subject is a valid human subject, whether the ID document and the human subject are in the same 3D space, and whether the human subject matches the information on the ID document. In response to determining that the valid ID document matches the valid human subject, system 100 may perform some action. Some examples of actions may include outputting a physical security risk classification, e.g. indicating a degree of certainty that the ID document is valid, that the human subject is valid, and/or that the information on the ID document matches the human subject. Other examples of actions may include allowing access to an environment, such as opening a locked door, allowing access to secured electronic information, authorizing a transaction such as a transfer of funds, opening a bank account and other similar actions.

System 100 includes a computing device 120 with at least two cameras 122 and 124. Each camera may have a different field of view and capture images within its field of view. Device 120 may include processing circuitry, such as one or more processors as well as computer readable storage media configured to store images received from cameras 122 and 124. In the example of FIG. 1, the second field of view for camera 124 is in substantially an opposite direction from the first field of view 102 for camera 122. Because cameras 122 and 124 are both installed on device 120, the field of view 102 for camera 122 and the field of view for camera 124 are in the same 3D environment, indicated by 3D axes 126.

Computing device 120 may represent a smartphone, tablet computer, laptop computer, or other handheld or portable computing device. Computing device 120 may have dual cameras oriented in substantially opposite directions. In some examples, computing device 120 is not a portable device but is instead another type of computing device, such as a server or controller. Computing device 120 may be located at a remote location. In such examples, computing device 120 may be communicatively coupled to and obtain images captured by cameras 122, 124, which may be mounted a separate apparatus, or computing device 120 may read the images captured by cameras 122, 124 from a storage device.

In the example of FIG. 1, field of view 102 for camera 122 includes a human subject 104 and one or more visual features, such as item 106 and light source 108. Each item in field of view 102 has a position relative to camera 122. For example, item 106 has a position 114 relative to camera 122 at that location of camera 122. Position 114 may indicate an angle and/or a distance of the item 106 from camera 122. Light source 108 may also have a position relative to camera 122. Other examples of visual features in the field of view, like item 106 and light source 108, may include furniture, windows, art display, vehicles, trees and other vegetation, other people, and so on.

The field of view for camera 124 may include ID document 130. ID document 130 is usable for verifying the identity of a human subject and may be, for instance, a driver's license, a passport, an employee badge, an identification card, or other document. In other words, comparing the ID document to a human subject may verify that information in the ID document describes a particular human subject. ID document 130 may include a photograph 132 of a human subject, such as human subject 104. ID document 130 may also include other information 136 describing the human subject photograph 132. Other information may be in the form of text, barcodes, color codes, etc., and may include information such as height, weight, eye color, name, address and similar information for the human subject identified by the ID document. ID document 130 may also include one or more anti-fraud features such as special inks and markings, such as hologram 134. ID document may also include other information stored in other formats such as an embedded computer readable storage media, e.g., a magnetic strip, embedded integrated circuit, or other similar features (not shown in FIG. 1).

In some examples, human subject 104 may hold device 120 and ID document 130 such that camera 122 captures first images that include human subject 104 and are within field of view 102. Human subject 104 may also hold ID document 130 such that camera 124 captures second images including ID document 130 within the field of view of camera 124. For example, human subject 104 may hold ID document 130 at arms' length and hold device 120 between ID document 130 and human subject 104.

In some examples, human subject may move device 120 such that camera 122 and camera 124 move in 3D space relative to human subject 104 and ID document, as well as other items within the 3D environment such as walls, doors, light sources, furniture, and so forth. Movement may include translation in the physical space and/or rotation about the axes of the device 120. In this manner, cameras 124 and 122 capture images of the respective fields of view from a variety of different poses, where poses are defined as a combination of angles, orientations and positions. The movement of device 120 may also allow cameras 122 and 124 to capture a wider field of view than if device 120 were held stationary. Processing circuitry within device 120 may cause computer readable storage media, such as a memory device, to receive first images from camera 122 within field of view 102 and second images from camera 124. In other words, device 120 may receive first images that capture a first plurality of visual features within field of view 102 from a plurality of different poses. Device 120 may also receive second images that capture a second plurality of visual features from ID document 130 from a plurality of different poses.

In some examples, each image of the first images received by device 120 from camera 122 has a corresponding one of the second images received by device 120 from camera 124. In other words, each image received from camera 122 may have a corresponding image from camera 124 captured substantially synchronously. In other examples, each image received from camera 122 may have a corresponding image from camera 124 captured at a known offset in time from each other. As such, each of cameras 122, 124 generate a different sequence of images to form pairs of images that correspond to one another in time. The images may be timestamped or otherwise stored in association with identifying information for determining an order of a sequence of images in time, as well as correspondence between images from sequences captured by cameras 122, 124.

Receiving images of field of view 102 at different poses to compare to the received images from camera 124, may be considered multi-dimensional visual content realization. Multi-dimensional visual content realization includes identifying one or more visual features from first images from camera 122 of field of view 102 as well as visual features from the second images from camera 124. The computing device 120 may compare visual features captured at different angles from camera 122 to visual features captured at different angles from camera 124. In some examples, the visual features may include low level features, such as edges, shapes and similar features. In this manner, by applying multi-dimensional visual content realization to the first images and the respective, corresponding second images, computing device 120 may determine whether human subject 104 matches photograph 132.

In some examples, computing device 120 may compare a portion of a 3D structure to a second structure to determine a match. For example, computing device 120 may estimate the 3D structure of a motor, or other object, that has a part missing, such as a missing bolt or other fastener. Computing device 120 may compare the structure of the missing part from motor to a library of 2D/3D representation of fasteners stored in memory. In some examples the memory may be a remote database linked through a communication network. In some examples, a user may take images of a two or more bolts or fasteners that are available and store the 3D representations in a memory. Computing device 120 may compare the representations of the fasteners in memory to the 3D structure of the missing part on the motor. Computing device 120 may determine which fastener best fits the missing part of the motor.

In some examples, computing device 120 may process the first images with the respective, corresponding second images to determine respective three-dimensional (3D) locations for at least one of camera 122 and camera 124, at the respective times the first images and the corresponding second were substantially synchronously captured, or captured with a known offset in time. Computing device 120 in this way generates a sequence of 3D locations for the at least one of camera 122 and camera 124. In some examples, where camera 122 and camera 124 are mounted to computing device 120 or another apparatus with fixed relative positioning, the relative position in 3D space of camera 122 to camera 124 as well as the relative locations and coverage angles of field of view 102 relative to the field of view of camera 124 may be known. In other examples, computing device 120, or some other computing device in communication with device 120, may determine the relative position in 3D space of camera 122 to camera 124. As one example, computing device 120 may output a directive, via a display or audio device, to human subject 104 to move device 120 through a defined series of movements. Based on the changes in the respective fields of view of cameras 122 and 124 as indicated by the respective sequences of images, the computing device 120 may determine the relative location and fields of view of camera 122 and camera 124.

Processing circuitry within device 120, or another computing device in communication with device 120, (simply referred to as processing circuitry for the remainder of the description of FIG. 1) may execute one or more processing routines to determine whether the ID document is a valid ID document. ID documents may be tampered with or fraudulently made. In some examples a valid ID document may include specialized inks that are only visible using specialized light sources. In some examples, device 120 may include a specialized light source, such as light source 110. Light source 110 may be permanently mounted on device 120, or, as in the example of FIG. 1, may be an accessory that may be temporarily connected to device 120. Light source 110 may output a light beam 112 that may comprise wide band or narrow band infra-red (IR), ultraviolet (UV) light and other frequencies, or combinations of frequencies of light. Camera 124 may be configured to capture images from ID document 130 illuminated by light source 110. Computing device 120 may process images received from camera 124 and determine whether the specialized inks are present in ID document 130. Computing device 120 may apply policies that require the presence of specialized inks as part of the determination of whether ID document 130 is valid.

In other examples, computing device 120 may apply motion-layer segmentation and/or best-focus algorithms to images from camera 124 to help determine the validity of ID document 130, such as examples in which specialized light source 110 is not available. In some examples, images from camera 124 may be processed to separate portions of ID document 130 into component layers. A first layer may include photograph 132, a second layer may include hologram 134 and other layers may include one or more portions of other information 136.

In some examples one or more component layers may include images received from camera 124 of ID document 130 that include specular images of field of view 102. In other words, depending on the reflectivity of ID document 130, images received from camera 124 may include a reflection of the visual features in field of view 102, such as human subject 104, light source 108 and other items in the background of human subject 104. Computing device 120 may compare the specular images from camera 124 to images from camera 122, for example, to determine whether ID document 130 is in the same 3D space as human subject 104, provide additional constraints to know where each camera 122 and 124 is located in 3D space and to improve confidence of the determination that the human subject is a live, human subject rather than spoof such as a 2D photograph, a projection, a video image, or some other spoof. In other words, computing device 120 may track features in the scene frame to frame, to evaluate changes in camera scope.

In some examples, computing device 120 may determine a first position relative to camera 122 of a first visual feature, such as light source 108, in field of view 102. Computing device 120 may further determine a second position relative to camera 124 of the visual feature in the specular images of field of view 102 received from camera 124. Computing device 120 may compare the position of light source 108 received from camera 122, e.g. the relative angle and distance of light source 108 from camera 122, with an expected position of a reflection of light source 108 in the specular image of field of view 102 received from camera 124. In other words, computing device 120 may compare the 3D position of the one or more light sources from the first images received from camera 122 to the 3D position of the one or more light sources from the second images received from camera 124. In some examples, the presence or absence of a reflected version of light source 108 or other item in the specular image, or an unexpected position of the reflection of light source 108 or other item in the specular image may indicate whether the images received from camera 122 are images of a valid human subject and a valid ID document or a spoof attempt.

In some examples the comparison of visual features received from field of view 102 and the specular image from camera 124 may be a comparison of high-level features, e.g., light source 108, a picture frame, human subject 104 etc. In other examples the comparison may be low-level comparisons, e.g., the edges or similar features of item 106, and low-level shapes, such as the curvature of the ears of human subject 104.

In some examples, the 3D position of visual features may be tracked over time and the temporal tracking may be used to determine the validity of the images of human subject 104 and ID document 130. As one example, as device 120 moves, the 3D position of light source 108 relative to camera 122 changes. The reflected image of light source 108 should move in an expected manner in the spectral image received from camera 124 based on the temporal movement of light source 108 in the images from camera 122. Computing device 120 may determine the validity of the images from cameras 122 and 124 based in part on whether the temporal movement follows an expected temporal movement.

In some examples, computing device 120 may process the images to perform image stitching of the first images of field of view 102 to form a first stitched image. The motions of cameras 122, 124 may provide images of features in field of view 102 to be taken from a variety of different angles. The first stitched image may include a 3D image of human subject 104, which may overcome an attempt to spoof a human subject by holding a photograph in front of camera 122.

In other examples, computing device 120 may process the first images to develop a 3D structure model of the human subject. In the example of a spoof attempt by holding up a photograph, the 3D structure model of the photograph may be determined to be a 2D image rather than a valid human subject.

The 3D images of human subject 104 may also be evaluated by monitoring additional dynamic biometric streams from temporal behaviors. One example of a biometric stream may include tracking temporal movement of iris of the eye and comparing the tracked movements to iris movements expected by a human subject. Because the 3D structure of the face changes over time, i.e. expressions, eye movement, mouth movement and so on, dynamically tracking the 3D structure over time may overcome spoof attempts, such as by a mask, mannequin head, or 2D photo. Comparing the images from the two cameras may improve the confidence in the features in each frame, i.e., each image of the series of images. Improved 3D position information determined by the simultaneous use of cameras 122 and 124 may improve developing the 3D structure model from features from human subject 104 and in liveness detection, e.g. by giving a better characterization of 3D structure over time when compared to other techniques.

In the example of a spoof attempt by using a spoofing device such as a mannequin or a mask, the 3D structure of the spoofing device may not change over time as expected, such as by changes of expression, eye movements, and other facial dynamics. By computing the 3D structure of a human subject over time, computing device 120 may determine whether or not the human subject is a valid human subject.

Computing device 120 may also develop a 3D structure model from a plurality of the specular images of the first field of view in the second images. Computing device 120 may compare the first 3D structure model to the second 3D structure model. As discussed above, the comparison may include high level, low level and/or temporal comparisons to determine whether the spectral image from camera 124 matches the images of field of view 102. In some examples the comparison may be compared to a comparison threshold.

In some examples, computing device 120 may compute the dimensions of the 3D structure of an object in the first field of view. As depicted in FIG. 1, an object may be a human subject, but in other examples, the object may be anything in the first field of view 102. Some examples of objects may include a room in a building or other structure, a vehicle, a meal, a container, and so on. For a human subject, computing device 120 may determine the 3D structure of the head of the human subject 104, as described above. In some examples, computing device 120 may determine the entire, absolute dimensions of the human subject, such as to help determine what size of clothing that would fit human subject 108. In other examples, computing device 120 may determine the dimensions of the interior of a vehicle, such as to determine whether the vehicle interior is large enough to carry a particular load. In other examples, computing device 120 may determine the volume of a meal, for example to compute the number of calories in the meal. In other examples, in determining the dimensions of a room, computing device 120 may determine a location to center a painting on a wall or whether a piece of furniture will fit in a selected location.

In some examples, computing device 120 may verify that the images of human subject 104 from camera 122 are of a valid human subject by determining a best-focused image of a skin surface of human subject 104. Computing device 120 may determine that ID document 130 is a valid ID document by setting camera 124 to a fixed focal length and determining, a best-focused image of a textured surface of ID document 130. In other examples, computing device 120 may set camera 124 to automatically focus. Computing device 120 may compare the best-focused image of the skin surface of human subject 104 to best-focused image of ID document 130. In this manner computing device 120 may determine whether human subject 104 matches the information on ID document 130.

As discussed above, human subject 104 may move device 120 to capture images of human subject 104 and of ID document 130. In some examples, computing device 120 may guide the user to position the device 120 to capture first images from camera 122 and second images from camera 124 approximately simultaneously. In some examples, device 120 may output visual or audible cues to guide the movement of device 120. For each image, computing device 120 may crop the image to the region of interest, extracts luminance information, and determine one or more energy levels of the luminance via a Laplacian pyramid. The energy levels may be filtered and then compared to energy levels of the other images to determine the best-focused image.

In this manner, computing device 120 may determine, based on the sequence of 3D locations, the first images from camera 122, and the second images from camera 124, whether the human subject matches the photograph. The techniques of this disclosure may provide advantages over other techniques for identity verification. For example, the use of two cameras oriented in substantially opposite directions, simultaneously capturing a series of images may improve the information describing the 3D location of each camera, for example, by increasing the constraints usable for computing the 3D locations. The improved knowledge of the camera locations may provide a number of advantages including the ability to predict where a visual should be and therefore whether the scene captured by the cameras is reality and not a spoof attempt. The movement of device 120 relative to ID document 130 and human subject 104, may capture images within the field of view of each camera from a variety of angles, as well as increasing the field of view of each camera. The relative movement and improved 3D location accuracy may improve the 3D modeling of human subject 104 as well as the motion-layer segmentation of both field of view 102 from camera 122 and layer segmentation of ID document 130. The image processing may also add best-focus algorithms to further improve the confidence in the features used for comparison. Best focus processing may also be combined with liveness analysis based on dynamic tracked features response over time to improve validity testing for human subject 104 as well as comparison checks against ID document 130. Device 120 may output a security risk classification based on the combined analysis. The security risk classification may allow a system to perform one or more actions, such as allow or deny access to a physical or a data environment.

Figure 2:
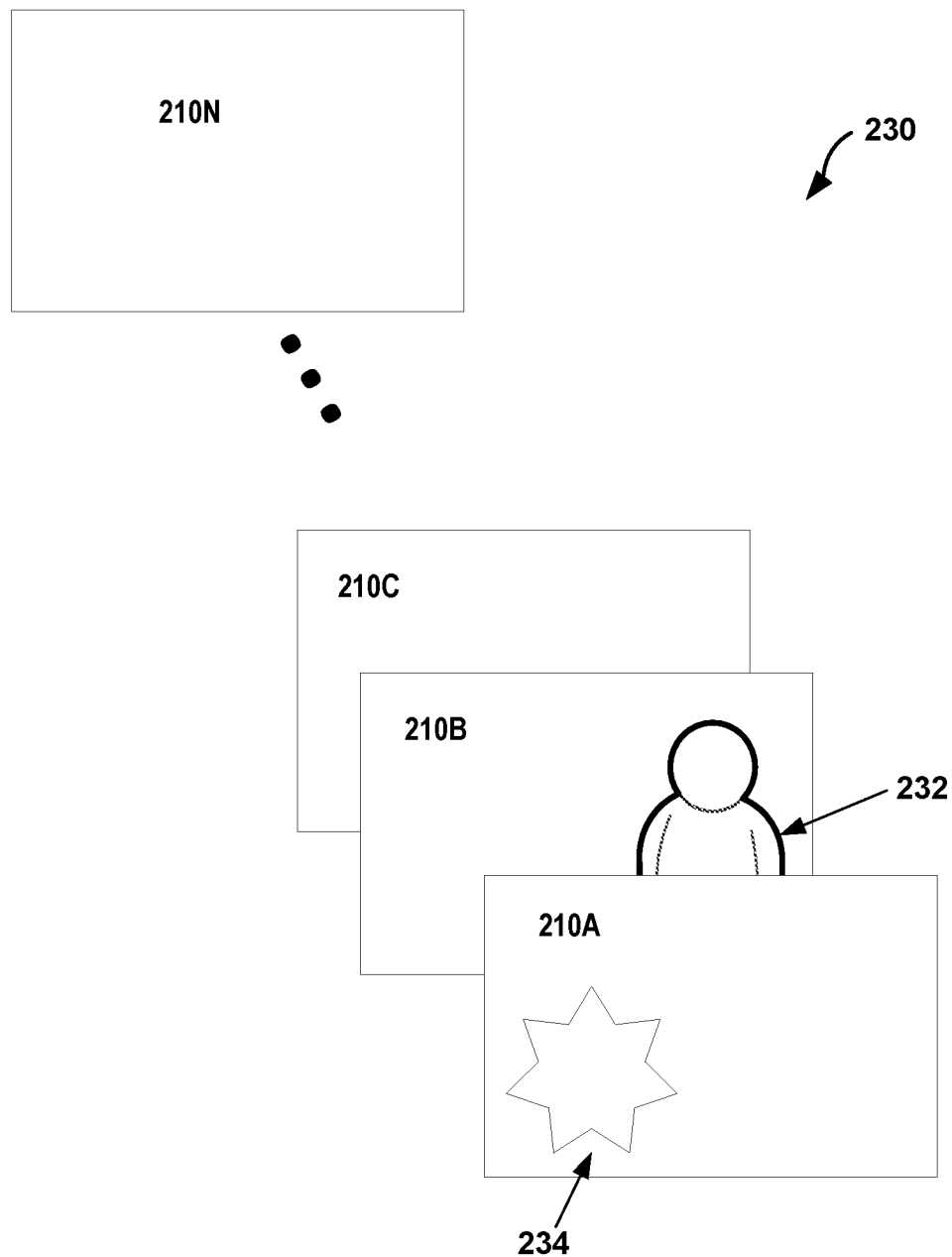
FIG. 2 is a conceptual diagram illustrating an example of image layer segmentation according to one or more techniques of this disclosure.

FIG. 2 is a conceptual diagram illustrating an example of image layer segmentation according to one or more techniques of this disclosure. The example of FIG. 2 depicts images of ID document 230 that have been segmented into layers. ID document 230 may be an example of ID document 130 described above in relation to FIG. 1. The example of FIG. 2 is just one example of possible layers that images may be processed to separate an object into any number of layers.

FIG. 2 depicts image layers 210A, 210B, 210C through 210N. A device according to the techniques of this disclosure may robustly separate image sequences into component layers with independent motions of the camera in relation to objects in the field of view, as described above in relation to FIG. 1. Images of the ID card at different angles may facilitate improved volumetric as well as surface feature analysis of ID document 230.

Layer 210A depicts hologram 234, which is an example of hologram 134 depicted in FIG. 1. In some examples, the relative movement between a device with a camera, such as device 120 described above in relation to FIG. 1, may provide multiple images over time of hologram 234. The multiple images may provide a dynamic view of hologram 234. In other words, the holographic layer including hologram 234 may change as the view angle changes. Comparing the received images of hologram 234 to expected views of hologram 234, such as by template lookup and database matching may help overcome an attempt at spoofing a hologram, such as by a fraudulent ID document.

Layer 210B may include photograph 232 of a human subject. As described above in relation to FIG. 1, the improved information of the 3D location of the cameras relative to the ID document may facilitate improved high level and/or low level visual feature matching with the images of a human subject.

The component layers may be segmented according to classification of other regions on ID document 230. Some examples of other regions may include barcodes, computer readable symbols that may be visible or invisible to a human eye, text information and other similar regions, as described above in relation to FIG. 1. In some examples, layers 210C to 210N may include text information that may be computer readable. Computing device 120, similar to that described in relation to FIG. 1 may translate the text information and perform comparisons to the images of the human subject. Some example of comparison may include eye color, height and similar information.

Computing device 120 may also compare an overall layout, as well as specific visual features on one or more component layers to a template for ID document 230. For example, computing device 120 may classify the category of ID document 230 as a passport, driver's license or other ID document, and determine the issuing authority. Computing device 120 may consult a database of templates by a variety of issuing authorities, e.g. a national government, state or province government, or other entity. Computing device 120 may select a template specific to the determined category and compare visual features on various component layers to a selected template to determine the validity of ID document 230. In some examples, comparison techniques may include change detection between the templates and the associated visual features on the component layer. In response to determining that the degree of matching of the images of ID document 230 to the selected template satisfies a predetermined matching threshold, computing device 120 may determine that ID document 230 is valid.

One or more component layers may also include specular images of the field of view that includes the human subject. The processing circuitry may perform surface analysis from specular image tracking. As described above in relation to FIG. 1, the specular image analysis may include matching expected positions of visual features in the specular image to a simultaneously captured image from the opposite camera, i.e. the camera receiving images of the human subject.

Figure 3:
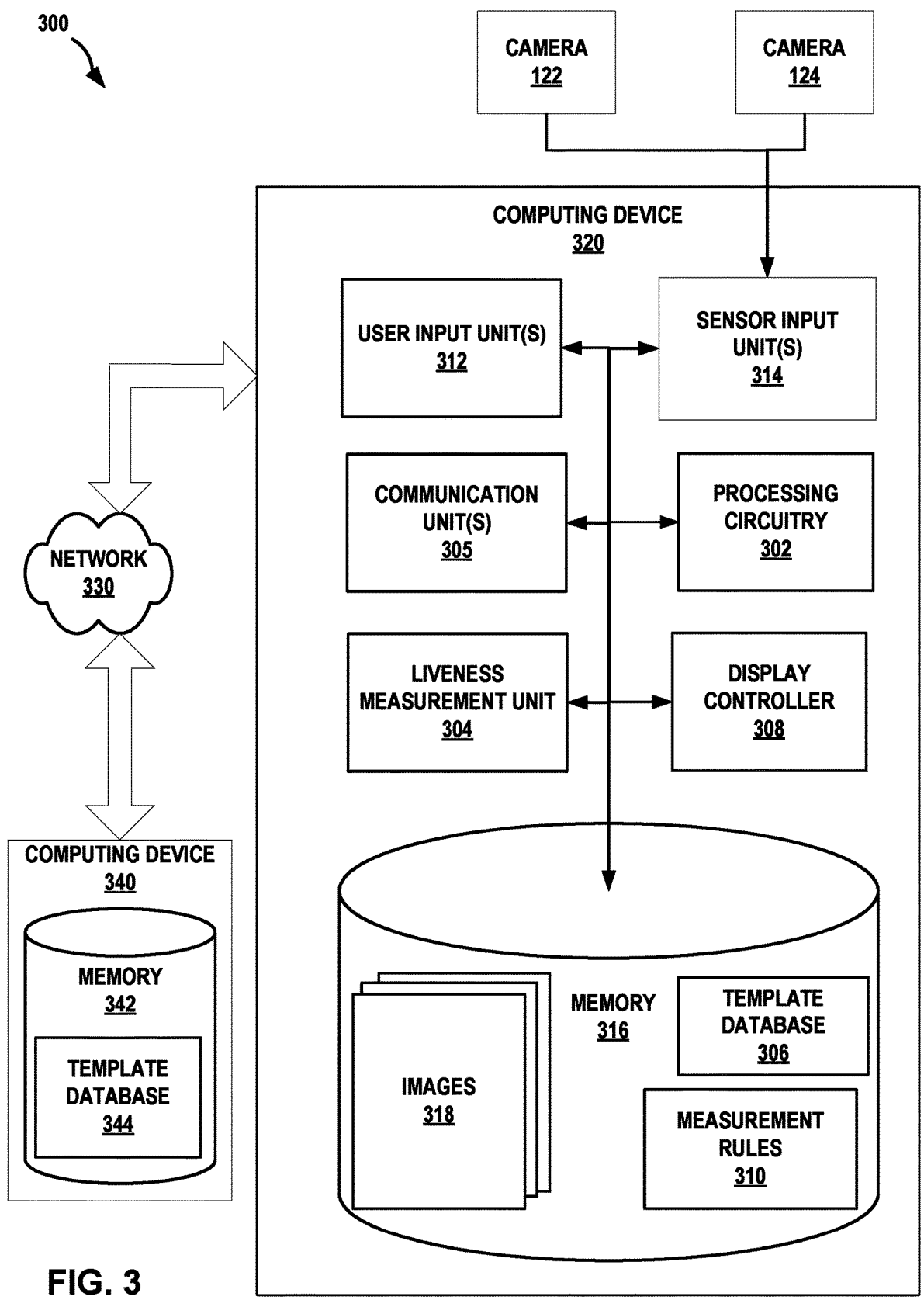
FIG. 3 is a block diagram illustrating a system for estimating 3D structure according to one or more techniques of this disclosure.

FIG. 3 is a block diagram illustrating an identity verification system according to one or more techniques of this disclosure. In the example of FIG. 1, system 300 includes computing device 320, cameras 122 and 124, network 330, and computing device 340 memory 342. Computing device 320 may be an example of device 120 described above in relation to FIG. 1.

In the example of FIG. 3, computing device 320 includes one or more user input unit(s) 312, one or more sensor input unit(s) 314, display controller 308, liveness measurement unit 304, one or more communication unit(s) 305, memory 316, and processing circuitry 302. However, in other examples, computing device 320 may include fewer, additional, or different components and/or circuitry.

Processing circuitry 302, in one example, is configured to implement functionality and/or process instructions for execution within computing device 320. For example, processing circuitry 302 may be configured to process instructions stored in memory 316. Examples of processing circuitry 302 may include any one or more of a microcontroller (MCU), e.g. a computer on a single integrated circuit containing a processor core, memory, and programmable input/output peripherals, a microprocessor (µP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that integrated processing circuitry may be realized as fixed hardware processing circuitry, programmable processing circuitry and/or a combination of both fixed and programmable processing circuitry.

Memory 316 may be configured to store information within computing device 320 during operation, such as images received from cameras 122 and 124 as described above in relation to FIG. 1. Memory 316, in some examples, is described as a computer-readable storage medium. In some examples, memory 316 is a temporary memory, meaning that a primary purpose of memory 316 is not long-term storage. Memory 316, in some examples, is described as a volatile memory, meaning that memory 316 does not maintain stored contents when the computer is turned off. Examples of volatile memories include random access memories (RAM), dynamic random access memories (DRAM), static random access memories (SRAM), and other forms of volatile memories known in the art. In some examples, memory 316 is used to store program instructions for execution by processing circuitry 302. Memory 316, in one example, is used by software or applications running on computing device 320 to temporarily store information during program execution.

Memory 316, in some examples, also include one or more computer-readable storage media. Memory 316 may be configured to store larger amounts of information than volatile memory. Memory 316 may further be configured for long-term storage of information. In some examples, memory 316 includes non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In the example of FIG. 3, memory 316 stores template database 306 that may include templates for ID documents. A robust template database may contain templates for a wide variety of categories of ID documents for numerous issuing agencies, including specific visual features such as dynamic hologram images. Because such a robust database may be quite large, in some examples, template database 306 may include templates for ID documents in the geographic region in which device 320 is located, such as ID document templates for nearby states or provinces. Computing device 320 may communicate through network 330 to one or more additional computing devices, such as computing device 340, to retrieve additional templates as needed. Computing device 340 may include memory 342 with template database 344, which may include a numerous other templates.

Template matching is a technique in digital image processing to find small parts of images that match an image template stored in template database 306 and/or 344. Templates matching is pattern recognition of stored templates that if matched with information from sensors, such as cameras lead to recognition of an object. Template matching is a digital image processing method to compare between two similar objects by using small parts of an image that matches to the original image. Template matching is the process of looking for a template object on an entire object in an image. As described above in relation to FIG. 1, template objects may be low level (e.g. edges) or high level. Processing circuitry 302 may compare the template retrieved from template database 306 to the visual features of images from cameras 122 and 124 depicted in FIG. 1. Comparison between templates with all objects in the image can be done by calculating a difference by a variety of techniques. In some examples the difference may be compared to a predetermined threshold. If the difference is small enough to satisfy the threshold, processing circuitry 302 may determine that the visual feature matches the template. In some examples, in response to determining that the visual features of images of an ID document match the template and satisfies a predetermined threshold, processing circuitry 302 may determine that the ID document is valid. In other examples, determining which category of ID document and performing template matching comprises applying multi-dimensional visual content realization to the images of the ID document as described above in relation to FIG. 1.

One or more communication units 305 of computing system 320 may communicate with devices external to computing system 320 (or among separate computing devices of computing system 320) by transmitting and/or receiving data, and may operate, in some respects, as both an input device and an output device. In some examples, communication units 305 may communicate with other devices over a network. In other examples, communication units 305 may send and/or receive radio signals on a radio network such as a cellular radio network. Examples of communication units 305 include a network interface card (e.g. such as an Ethernet card), an optical transceiver, a radio frequency transceiver, a GPS receiver, or any other type of device that can send and/or receive information. Other examples of communication units 305 may include Bluetooth®, GPS, 3G, 4G, and Wi-Fi® radios found in mobile devices as well as Universal Serial Bus (USB) controllers and the like.

In some examples, computing device 320 may communicate to network 330 via communications unit 305. Computing device 320 may outsource some identity verification functions to computing device 340. Some identification functions that may be outsourced may include image processing using specialized light sources, or other identity verification functions that may require computationally intensive tasks.

In some examples, memory 316 may include measurement rules 310, each rule specifying one or more criteria indicative that sensed physiological signals are from living biological tissue. For example, measurement rules 310 may specify values for spatial, temporal, or phase relationships of physiological signals, such as head movements, eye movements, head shapes, relationship of visual features such as eye position to mouth position and similar rules. Other measurement rules may include expected pattern from specialized inks, as described above in relation to FIG. 1.

Computing device 320, in one example, also includes one or more user input unit(s) 312. User input unit(s) 312, in some examples, are configured to receive input from a user through tactile, audio, or video feedback. Examples of user input unit(s) 312 include a presence-sensitive screen (which may also include a display), a mouse, a keyboard, a voice responsive system, video camera, microphone or any other type of device for detecting a command from a user. In some examples, a presence-sensitive screen or display includes a touch-sensitive screen. Computing device 320 may also include one or more output devices (not shown), such as speakers, lights, or display devices.

Computing device 320 includes one or more sensor input units 314. Sensor input unit 324 is configured to receive electrical signal input from one or more sensors, such as cameras 122 and 124. Computing device 320 may convert the electrical signal input into a form usable by computing device 320. For example, sensor input unit(s) 314 may include software or hardware configured to convert a received signal input from an analog signal to a digital signal. In another example, sensor input unit(s) 314 may include software or hardware configured to compress, decompress, transcode, encrypt, or decrypt a received signal input into a form usable by computing device 320. In this manner, sensor input unit(s) 314 may be configured to interface with, or communicate with, one or more sensors. For example, sensor input unit(s) 314 may receive images from each of cameras 122 and 124, process and store images 318 in memory 316. Sensor input unit(s) 314 may be communicatively coupled to cameras 122, 124 via any wired or wireless connection.

Display controller 308 may also be included in computing device 320. Display controller 308, in some examples, is configured to control an output device to provide output to a user using video stimuli. Display controller 308, in one example, includes software or hardware for controlling a video graphics adapter card or a display screen. In another example, instead of controlling a display to provide visual output to a user, display controller 308 controls a sound card, a speaker, or a presence-sensitive display to provide audio or tactile output to a user. In other examples, display controller 308 is configured to control any other type of output device for converting a signal into an appropriate form understandable to humans or machines or any type of device that can generate intelligible output to a user. For example, display controller 308 may convert a signal into visual or audible cues to guide the movement of device 320, as described above in relation to FIG. 1.

Computing device 320 may further include liveness measurement unit 304. Liveness measurement unit 304 may comprise software, hardware, circuitry, or a combination thereof configured to perform the functions of a liveness measurement unit. Liveness measurement unit 304 may process images comprises tracking a movement of one or more facial features of a human subject, such as human subject 104 in field of view 102 as described above in relation to FIG. 1. Liveness measurement unit 304 may apply one or more rules to spatial relationship and/or temporal movement of the facial features. Liveness measurement unit 304 may retrieve such rules from memory 316, or from computing device 340 via network 330. In response to applying the one or more rules, liveness measurement unit 304 may determine whether the movement of the facial features are from living biological tissue from the human subject. In other words, liveness measurement unit 304 may compare changes to the 3D structure of a human subject over time to determine whether the changes in the temporal changes in the 3D structure caused by changes in expression and other movement is consistent with a live human subject.

In some examples, computing device 320 may determine compare a best focused image of a skin surface of the human subject to a best focused image of the ID document. To determine a best focused image of a skin surface of the human subject, processing circuitry 302 may set the first camera to a fixed focal length or in other examples, to automatically focus. Processing circuitry 302 may select, from images stored in memory 316, a first image of the first images of the skin surface, then select a first previous image to the first image. In other words, the first image selected follows the first previous image in the sequence of first images. Processing circuitry 302 may further select selecting a second previous image captured, i.e. the first previous image follows the second previous image in the first images.

Processing circuitry 302 may execute instructions stored at memory 316 to produce a modified image from the first image and transform the modified image, using a Laplacian pyramid, to produce a plurality of first luminance values from the modified image and a plurality of second luminance values from the plurality of first luminance values. Processing circuitry 302 may produce a first energy value by taking an average of a plurality of first squared values, in which each squared value includes a square of a corresponding first luminance value of the plurality of first luminance values. Processing circuitry 302 may further produce a second energy value by averaging a plurality of second squared values, each comprising a square of a corresponding second luminance value of the plurality of second luminance values. In some examples, processing circuitry 302 may temporarily store these intermediate values, e.g. the first and second energy values, at a memory location in memory 316.

Processing circuitry 302 may calculate a first ratio of the first energy value to the second energy value. Processing circuitry 302 may also determine an average first energy value of the first previous image by calculating an average of the first energy value, a corresponding first energy value of the first previous image, and a corresponding first energy value of the second previous image. Processing circuitry 302 may further determine an average first ratio of the first previous image by calculating an average of the first ratio, a corresponding first ratio of the first previous image, and a corresponding first ratio of the second previous image.

Processing circuitry 302 may use the previously calculated value to determine whether an image is a valid image. A valid image is an image that has: a corresponding average first energy value above an energy threshold value and a corresponding average first ratio approximately equal to 10.

Finally, processing circuitry 302 may determine whether a selected valid image is the best-focused image by comparing the average first energy values of an image to a previous valid image captured immediately before the selected valid image and to a subsequent valid image captured immediately after the selected valid image. A selected valid image may be considered a "best focused image" when the selected valid image has a corresponding average first energy value that is greater than the corresponding average first energy values of the previous valid image and the subsequent valid image. In an example where the average first energy value of the selected image is less than either the previous or subsequent image, processing circuitry 302 may select another valid image and continue to perform the comparison of the average first energy values.

Processing circuitry 302 may store the best focused image of the human subject to be compared to the photograph on the ID document.

Processing circuitry 302 may further determine a best focused image of the surface or other region of interest of the ID document. In some examples the surface of the ID document may be textured. Processing circuitry 302 may select an image of the ID document and apply a Laplacian pyramid to the selected image to generate a Laplacian pyramid having a first level based on the selected image and a second level based on the first level.

Processing circuitry 302 may further determine a first energy value of the selected image and a second energy value of the selected image. The first energy value may represent a Laplacian energy of the first level, i.e. based on the selected image. The second energy level may represent a Laplacian energy of the second level, i.e. based on the first level of the Laplacian pyramid.

To determine whether a selected image is a valid image, processing circuitry 302 may compare the energy values to energy thresholds. Specifically, processing circuitry 302 may determine whether the first energy value both exceeds an energy threshold and is approximately equal to the second energy value. In response to determining that the first energy value for the selected image exceeds the predetermined energy threshold and is approximately equal to the second energy value, processing circuitry 302 may determine that that the selected image is a valid image. In the same manner, processing circuitry 302 may evaluate the remaining images of the ID document, e.g. as captured by camera 124 depicted in FIG. 1, to determine which images are valid images.

To determine which of the valid images of the ID document is the best focused image, processing circuitry 302 may compare the first energy value of an image to each respective first energy value of each respective valid image of the second images of the ID document. In some examples, processing circuitry 302 may select the valid image with the highest average first energy value as the best-focused image. After selected the best focused image of the ID document, processing circuitry 302 may compare the best focused image of the ID document to the best focused image of the human subject using any of the high level, low level, change detection, other techniques or combination of techniques discussed above.

Although the components of computing device 320 may be hardwired together, one or more components of computing device 320 may be wirelessly connected to computing device 320 (e.g., one or more sensors may transmit data wirelessly to computing device 320).

Figure 4:
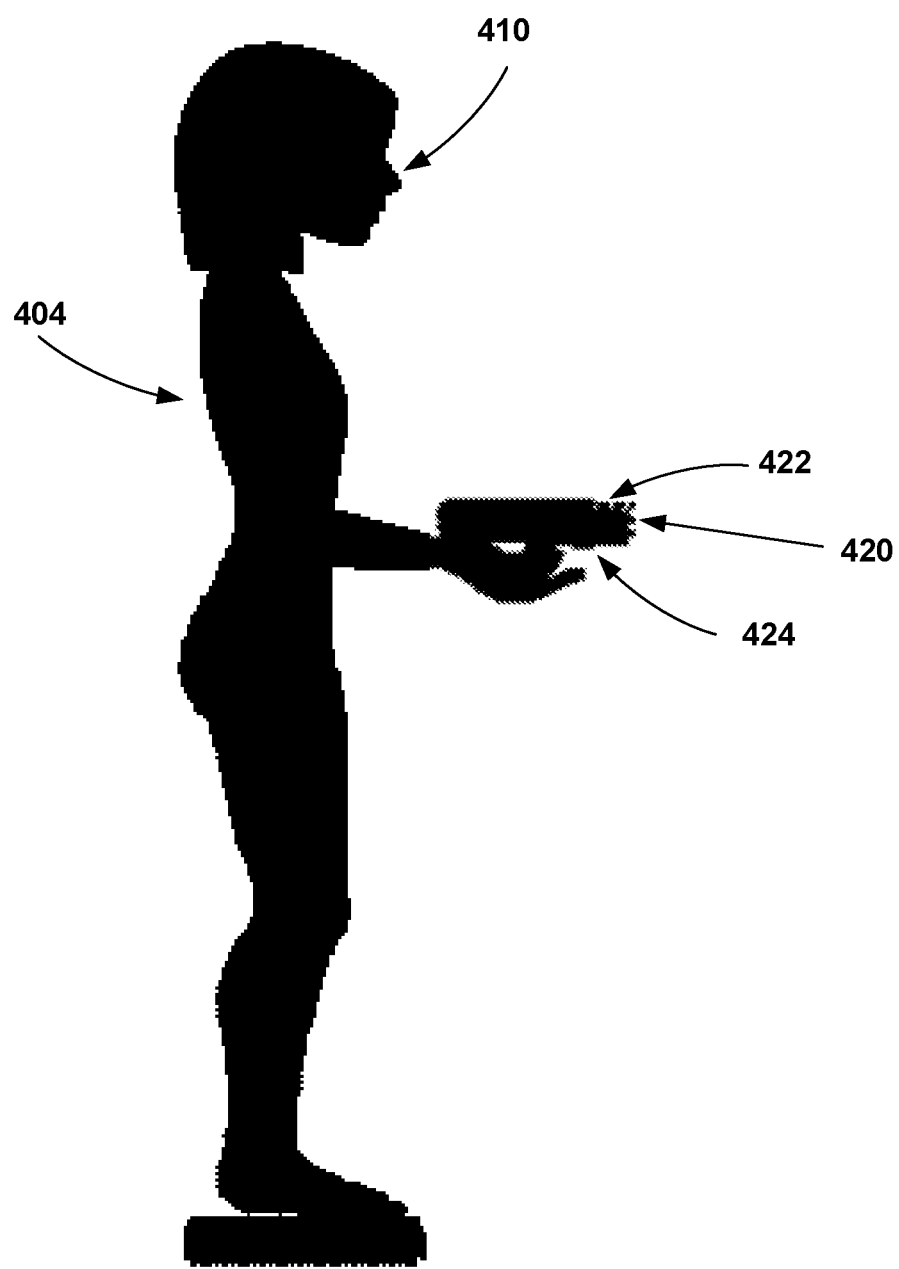
FIG. 4 is a conceptual diagram illustrating an example of techniques to determine whether synchronous images received from two cameras are of living biological tissue from a single human subject.

FIG. 4 is a conceptual diagram illustrating an example of liveness detection to determine whether images received from two cameras are of living biological tissue from a single human subject. In the example of FIG. 4, device 420 may be an example of computing device 120 depicted in FIG. 1. The techniques described regarding FIG. 4 may be used in conjunction with the techniques described above in relation to FIGS. 1-3, for example, either before or after capturing the images of field of view 102 and ID document 130.

Computing device 420 includes camera 422 and camera 424, which are examples of cameras 122 and 124 described above in relation to FIG. 1 and have the same functions and orientation. In the example of FIG. 4, human subject 404 may orient camera 424 to capture images of a first tissue region, such as a fingertip. In this manner, camera 424 may determine a pulse, as well as other biological signals, of human subject 404.

Human subject 404 may orient camera 422 such that the field of view of camera 422 may capture images of a second tissue region 410, such as facial tissue, an earlobe or similar tissue region. By sensing, for example, pulses from a finger a second tissue region 410, e.g., the throat or face of human subject 404, device 420 may detect different arrival times of the pulse caused by the relative distances the mechanical pulse travels to reach each of the finger and second tissue region 410. In this manner, device 420 may determine whether the pulse belongs to living biological tissue from a single human subject.

Photoplethysmography (PPG) is an optical technique that may be used to detect blood volume changes in the microvascular bed of tissue. PPG may be used non-invasively to make measurements at the skin surface. The PPG waveform comprises a pulsatile physiological waveform attributed to cardiac changes in the blood volume with each heartbeat. In some examples, the pulsatile waveform may be superimposed on a slowly varying ('DC') baseline with various lower frequency components, which may be attributed to respiration, sympathetic nervous system activity, thermoregulation and other physiological signals. In other words, images received from camera 424 may be used to for the photoplethysmographic detection of pulse, or other physiological signals.

Therefore, device 420 may prompt human subject 404 to orient the field of view of camera 422 to capture images of the first tissue region and orient the field of view of camera 424 to capture images of the second tissue region 410 at a time period different than the time period described above in relation to FIG. 1. Processing circuitry within device 420 may process the images from cameras 422 and 424 to perform a photoplethysmographic detection of a pulse. The processing circuitry may determine a difference value between a pulse arrival time (PAT) at the first tissue region and a PAT at the second tissue region. In response to determining whether the difference value satisfies a threshold, the processing circuitry may determine images during this second time period are from living biological tissue from a single human subject.

Figure 5:
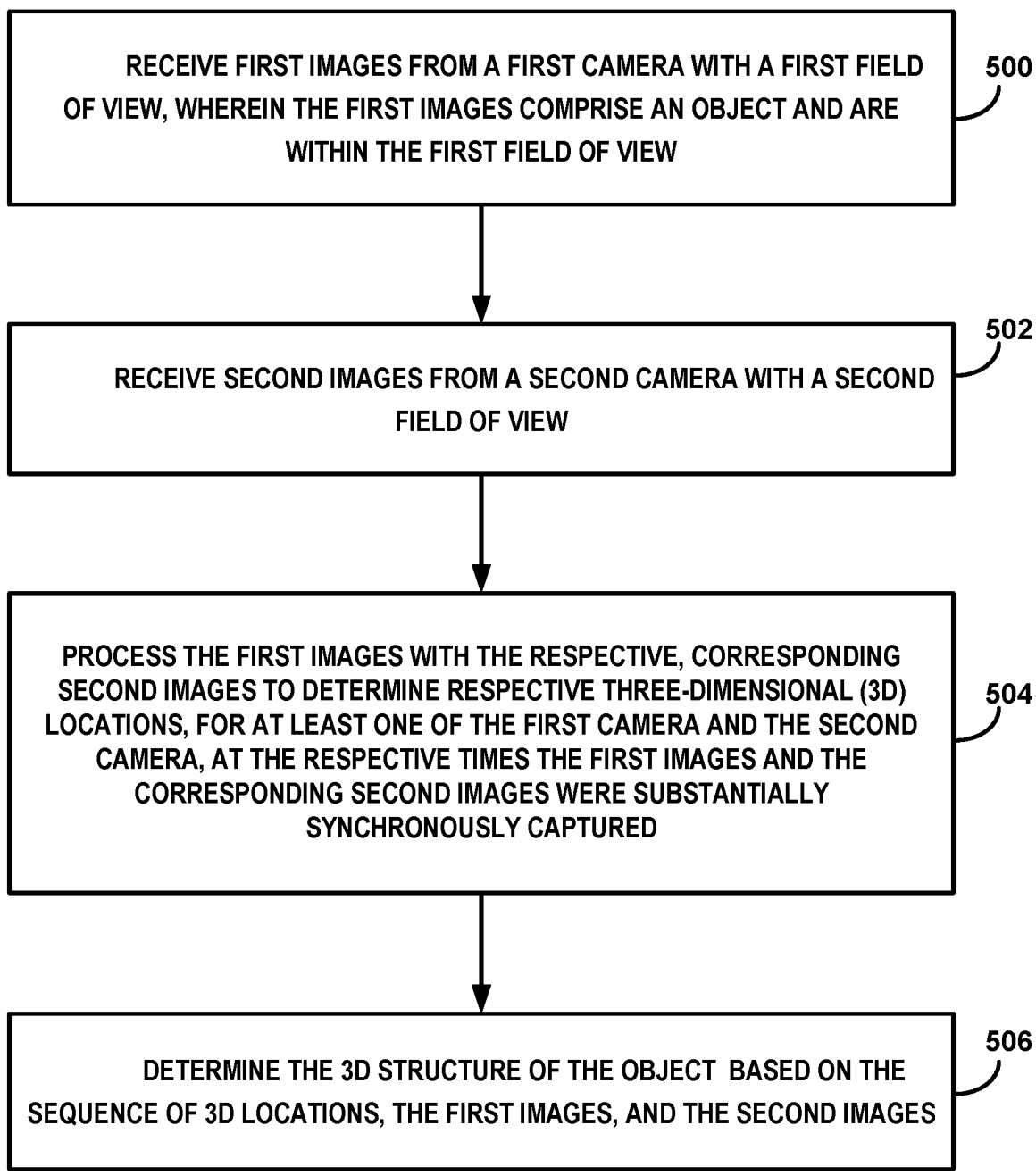
FIG. 5 is a flow chart illustrating an example mode of operation of system for 3D structure estimation according to one or more techniques of this disclosure.

FIG. 5 is a flow chart illustrating an example mode of operation of a system for identity verification, according to one or more techniques of this disclosure. The blocks of FIG. 5 will be described in terms of FIG. 1, unless otherwise noted. The example of FIG. 5 includes example techniques for determining whether an ID document identifies a valid human subject. However, this is only one example application of 3D structure estimation, as discussed above in relation to FIGS. 1-4.

Computing device 120 may receive first images from a first camera, e.g. camera 122 having a first field of view, e.g., field of view 102 (500). The fields of view of the cameras 122, 124 may change with movement by the cameras. The first images from camera 122 may include human subject 104, or some other object, along with background items in field of view 102.

Device 120 may also receive second images from a second camera 124 with a second field of view, which may include identification (ID) document 130 (502), or other items in the environment around the object. In some examples, each image received from camera 122 may have a corresponding image from camera 124 captured substantially synchronously. In other examples, each image received from camera 122 may have a corresponding image from camera 124 captured at a known offset in time from each other. Human subject 104 may move device 120 in a preset or a random manner such that cameras 122 and 124 capture images of the respective fields of view from a variety of different angles.

Device 120 may process the first images with the respective, corresponding second images to determine respective three-dimensional (3D) locations for at least one of the first camera and the second camera (504). Device 12 may determine the 3D locations of cameras 122 and 124 for each respective times the first images and the corresponding second were substantially synchronously captured. As described above in relation to FIG. 1, comparing respective images from the two cameras may provide improved determination of the 3D location of each camera, e.g. by providing additional constraints to the calculation.

Computing device 120 may determine the 3D dynamic structure of the object based on the sequence of 3D locations, the first images, and the second images (506). In some examples, device 120 may further determine, based on the sequence of 3D locations, the first images, and the second images, whether the human subject matches the photograph or other information on the ID document. In response to determining that the human subject matches the photograph, device 120 may perform some action (508), such as allow access through a physical barrier, such as a locked gate or door, permitting a user of an application executing on the computing device 120 to perform actions, such as opening an account, interacting with an existing account, interacting with the application further, allowing access to transfer funds or some other action. As described above in relation to FIG. 1, the improved determination of the respective 3D locations for the cameras may provide improved validity testing for both the human subject and the ID document. If the human subject does not match the photograph, computing device 120 may perform a different action, such as barring access to through the physical barrier, declining access to transfer funds, declining access to a web site, declining to open a new account or to interact with an existing account, sounding an alarm, and so forth.

In one or more examples, the functions described above may be implemented in hardware, software, firmware, or any combination thereof. For example, the various components of FIG. 3, such as processing circuitry 302 and liveness measurement unit 304 may be implemented in hardware, software, firmware, or any combination thereof. If implemented in software, the functions may be stored on or transmitted over, as one or more instructions or code, a computer-readable medium and executed by a hardware-based processing unit, i.e. processing circuitry. Computer-readable media may include computer-readable storage media, which corresponds to a tangible medium such as data storage media, or communication media including any medium that facilitates transfer of a computer program or data from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product such as an application may also include a computer-readable medium as well as sent through network 330, stored in memory 316 and executed by processing circuitry 302.

By way of example, and not limitation, such computer-readable storage media, may include memory 316. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method for identity verification, the method comprising:
   receiving, by a computing device, first images from a first camera with a first field of view, wherein the first images comprise a human subject and are within the first field of view;
   receiving, by the computing device, second images from a second camera with a second field of view,
      wherein the second images comprise images of an identification (ID) document, wherein the ID document comprises a photograph of the human subject, wherein the second field of view is in substantially an opposite direction from the first field of view, and wherein each image of the first images has a corresponding one of the second images captured substantially synchronously with the image;

processing, by the computing device, the first images with the respective, corresponding second images to determine a sequence of respective three-dimensional (3D) locations, for at least one of the first camera and the second camera, at the respective times the first images and the corresponding second images were substantially synchronously captured;

determining, by the computing device based on the sequence of 3D locations, the first images, and the second images, that the human subject is a valid human subject;

in response to determining that the human subject is a valid human subject and that the ID document describes the valid human subject, performing an action.

2. The method of claim 1, wherein the first camera and the second camera move in 3D space relative to the human subject and to the ID document.

3. The method of claim 1, wherein processing the first images with the respective, corresponding second images comprises determining a 3D location of the first camera and the second camera within a 3D environment.

4. The method of claim 1, further comprising:

processing the second images to separate the images of the ID document into a plurality of component layers, wherein a first component layer of the plurality of component layers comprises dynamic images of a hologram on the ID document and wherein a second component layer of the plurality of component layers comprises specular images of the first field of view.

5. The method of claim 1, wherein determining that the ID document describes the valid human subject human subject comprises determining that the valid human subject matches the photograph in the ID document.

6. The method of claim 1, further comprising determining a sequence of respective three-dimensional (3D) locations of the first camera and the second camera by:

determining a first position relative to the first camera of a first visual feature in the first field of view; and determining a second position relative to the second camera of the first visual feature in the specular images of the first field of view in the second images, comparing specular images of the first field of view in the second images to the images of the first field of view in the first images, and wherein determining whether the human subject matches the photograph comprises determining, based on the comparison, whether the ID document is in the same 3D space as the human subject.

7. The method of claim 6, further comprising:

determining a 3D position of one or more light sources in the first field of view from the first images;

determining a 3D position of the one or more light sources in specular images of the first field of view from the second images, wherein determining whether the human subject matches the photograph comprises comparing the 3D position of the one or more light sources from the first images to the 3D position of the one or more light sources from the second images.

8. The method of claim 1, further comprising computing, by the computing device, a 3D structure of the human subject based on the first images.

9. The method of claim 8, wherein determining that the human subject is a valid human subject further comprises determining, based on changes to the 3D structure over time, that the human subject is a valid human subject.

10. The method of claim 1, wherein performing an action comprises allowing access to an environment.

11. The method of claim 1, further comprising:

performing validity processing on the second images to determine whether the ID document is valid, wherein the validity processing comprises:

determining a category of ID document to which the ID document belongs;

selecting a template specific to the category of ID document;

performing template matching on the second images based on the selected template; and in response to determining that the template match of the second images satisfies a predetermined threshold, determining that the ID document is valid.

12. A computing device comprising:

a memory; and one or more processors coupled to the memory, wherein the one or more processors are configured to:

receive first images from a first camera with a first field of view, wherein the first images comprise a human subject and are within the first field of view;

receive second images from a second camera with a second field of view, wherein the second images comprise images of an identification (ID) document, wherein the ID document comprises a photograph of the human subject, wherein the second field of view is in substantially an opposite direction from the first field of view, and wherein each image of the first images has a corresponding one of the second images captured substantially synchronously with the image;

process the first images with the respective, corresponding second images to determine a sequence of respective three-dimensional (3D) locations, for at least one of the first camera and the second camera, at the respective times the first images and the corresponding second images were substantially synchronously captured;

determine, based on the sequence of 3D locations, the first images, and the second images, that the human subject is a valid human subject;

in response to determining that the human subject is a valid human subject and that the ID document describes the valid human subject, performing an action.

13. The computing device of claim 12, wherein the one or more processors are further configured to determine, based on the sequence of 3D locations and the second images, that the ID document is a valid ID document.

* * * * *